United States Patent
Ohhashi

(10) Patent No.: US 10,133,291 B2
(45) Date of Patent: Nov. 20, 2018

(54) IMAGE FORMING APPARATUS CONFIGURED FOR SCHEDULED SECONDARY BATTERY USAGE PERIOD

(71) Applicant: Kenichi Ohhashi, Kanagawa (JP)

(72) Inventor: Kenichi Ohhashi, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 769 days.

(21) Appl. No.: 14/497,659

(22) Filed: Sep. 26, 2014

(65) Prior Publication Data

US 2015/0094873 A1   Apr. 2, 2015

(30) Foreign Application Priority Data

Sep. 30, 2013   (JP) ................. 2013-202876

(51) Int. Cl.
  *G05B 15/02*   (2006.01)
  *G05F 1/66*   (2006.01)
  (Continued)

(52) U.S. Cl.
  CPC ............. *G05F 1/66* (2013.01); *B41J 29/13* (2013.01); *B41J 29/38* (2013.01); *B41J 29/393* (2013.01);
  (Continued)

(58) Field of Classification Search
  CPC .... G05F 1/66; B41J 29/13; B41J 29/38; B41J 29/393; G03G 15/5004; G03G 15/80; G03G 2215/00983; G05B 15/02
  (Continued)

(56) References Cited

U.S. PATENT DOCUMENTS 5,500,561 A * 3/1996 Wilhelm ................. H02J 1/06
                                                         307/48
5,764,030 A * 6/1998 Gaza ..................... H02J 7/0004
                                                        320/116
(Continued)

FOREIGN PATENT DOCUMENTS

CN   1476142 A   2/2004
CN   1728317 A   2/2006
(Continued)

OTHER PUBLICATIONS

Feb. 12, 2015 European search report in corresponding European Patent Application No. 14187119.4.
(Continued)

*Primary Examiner* — Jason D Mitchell
(74) *Attorney, Agent, or Firm* — Cooper & Dunham LLP

(57) ABSTRACT

An image forming apparatus includes a power supply controller that selects either commercial power or a secondary battery as a power supply and a main controller that controls the power supply controller. The main controller includes a power supply availability determination unit that determines whether or not both the commercial power and the secondary battery are available and a power supply selection unit that instructs the power supply controller to select the secondary battery as the power supply during a predetermined secondary battery usage period and instructs the power supply controller to select the commercial power as the power supply at times other than the secondary battery usage period in case both the commercial power and the secondary battery are available.

10 Claims, 8 Drawing Sheets

(51) Int. Cl.
*B41J 29/393* (2006.01)
*G03G 15/00* (2006.01)
*B41J 29/13* (2006.01)
*B41J 29/38* (2006.01)

(52) U.S. Cl.
CPC ......... *G03G 15/5004* (2013.01); *G05B 15/02* (2013.01); *G03G 15/80* (2013.01); *G03G 2215/00983* (2013.01)

(58) Field of Classification Search
USPC .......................................................... 700/297
See application file for complete search history.

(56) References Cited

U.S. PATENT DOCUMENTS

| | | | | |
|---|---|---|---|---|
| 6,362,536 | B1* | 3/2002 | Izumiura | B60K 6/485 290/40 C |
| 7,933,689 | B2* | 4/2011 | Warren | H02J 9/06 307/23 |
| 2003/0048323 | A1* | 3/2003 | Kaburagi | B41J 29/393 347/19 |
| 2004/0195996 | A1 | 10/2004 | Nishida | |
| 2006/0028168 | A1 | 2/2006 | Nishida | |
| 2006/0184810 | A1 | 8/2006 | Hamaguchi et al. | |
| 2006/0192531 | A1 | 8/2006 | Nishida | |
| 2007/0193808 | A1* | 8/2007 | Perakes | B60K 6/445 180/242 |
| 2007/0200433 | A1* | 8/2007 | Kelty | G06Q 50/06 307/66 |
| 2008/0211454 | A1 | 9/2008 | Nishida | |
| 2008/0226330 | A1* | 9/2008 | Nakazawa | G03G 15/5004 399/88 |
| 2008/0238358 | A1* | 10/2008 | Koide | G06F 1/26 320/106 |
| 2009/0324271 | A1 | 12/2009 | Hasegawa | |
| 2010/0028030 | A1* | 2/2010 | Maekawa | G03G 15/80 399/43 |
| 2011/0014533 | A1* | 1/2011 | Jennings | H01M 8/04619 429/428 |
| 2011/0273860 | A1* | 11/2011 | Corvese | B41J 3/36 361/816 |
| 2011/0320842 | A1* | 12/2011 | Narushima | G03G 15/5004 713/323 |
| 2012/0025630 | A1* | 2/2012 | Tsuda | G03G 15/5004 307/125 |
| 2013/0036320 | A1* | 2/2013 | Yoshimura | G03G 15/5004 713/323 |
| 2014/0020244 | A1* | 1/2014 | Carlson | H01L 31/02021 29/825 |
| 2014/0147157 | A1* | 5/2014 | Hiraguchi | G03G 15/80 399/88 |

FOREIGN PATENT DOCUMENTS

| | | |
|---|---|---|
| JP | 2004-284228 | 10/2004 |
| JP | 2006-229310 | 8/2006 |
| JP | 2008-15094 | 1/2008 |
| JP | 2008-068548 | 3/2008 |
| JP | 2008068548 A * | 3/2008 |
| JP | 2008-142896 | 6/2008 |
| JP | 2008-221755 | 9/2008 |
| JP | 2008221755 A * | 9/2008 |
| JP | 2008-234061 | 10/2008 |
| JP | 2008234061 A * | 10/2008 |
| JP | 2009-151489 | 7/2009 |
| JP | 2009-222824 | 10/2009 |
| JP | 2009222824 A * | 10/2009 |
| JP | 2011-193667 | 9/2011 |
| JP | 2012-39801 | 2/2012 |

OTHER PUBLICATIONS

Mar. 23, 2016 Chinese official action in connection with Chinese Patent Application No. 201410498573.1.
Japanese official action dated Jun. 6, 2017 in connection with corresponding Japanese patent application No. 2013-202876.

* cited by examiner

IMAGE FORMING APPARATUS CONFIGURED FOR SCHEDULED SECONDARY BATTERY USAGE PERIOD

CROSS-REFERENCE TO RELATED APPLICATION

This patent application is based on and claims priority pursuant to 35 U.S.C. § 119 to Japanese Patent Application No. 2013-202876, filed on Sep. 30, 2013 in the Japan Patent Office, the entire disclosure of which is hereby incorporated by reference herein.

BACKGROUND

Technical Field

The present invention relates to an image forming apparatus.

Background Art

Conventionally, image forming apparatuses that are equipped with a secondary battery are known. Existing image forming apparatuses have been using a secondary battery only for memory back-up while the main power is off or for supplying emergency power in case of unexpected shutdowns such as blackout.

SUMMARY

An example embodiment of the present invention provides a novel image forming apparatus equipped with a power supply controller that selects either commercial power or a secondary battery as a power supply and a main controller that controls the power supply controller. The main controller includes a power supply availability determination unit that determines whether or not both the commercial power and the secondary battery are available and a power supply selection unit that instructs the power supply controller to select the secondary battery as the power supply during a predetermined secondary battery usage period and instructs the power supply controller to select the commercial power as the power supply at times at times other than the secondary battery usage period in case both the commercial power and the secondary battery are available.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION

Figure 1:
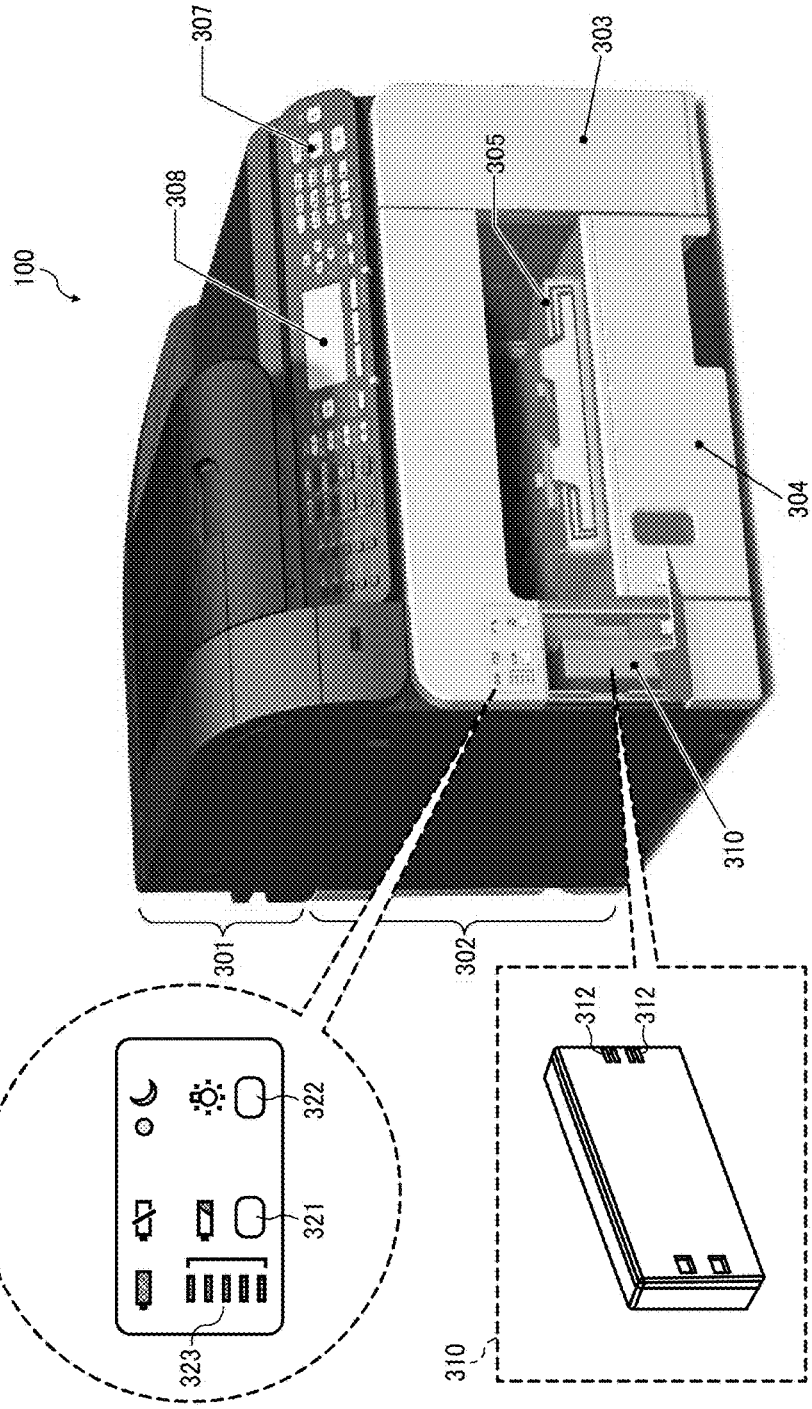
FIG. 1 is a diagram illustrating exterior appearance of a multifunctional peripheral (MFP) as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the following embodiment, a novel image forming apparatus that can contribute to leveling electricity demand peaks in offices is provided. More specifically, it is desirable to smooth out peaks in electricity demand in offices for various reasons. In a typical office, electricity demand peaks during daytime hours (9 AM to 5 PM), and in the breakdown of electrical power consumption office equipment ranks high, behind air conditioning and lighting.

FIG. 1 is a diagram illustrating exterior appearance of a multifunctional inkjet printer (hereinafter referred to as MFP) 100 in this embodiment.

The MFP 100 includes a scanner unit 301 and a printer unit 302, and the MFP 100 includes functions such as a copy function, print function, facsimile function, and a function of printing data stored in an external storage (e.g., a USB memory and a digital camera) directly.

The printer unit 302 includes space 303 where ink cartridges are inserted, a paper feed tray 304, a paper output tray 305, a control panel 307, and a liquid crystal panel 308 etc.

Here, the MFP 100 in this embodiment can select a large capacity secondary battery that consists of lithium-ion batteries or nickel-hydrogen battery etc. as power source in addition to commercial power supplied by an alternating current adapter (not shown in figures). In FIG. 1, a dedicated battery pack 310 is used as the high-capacity secondary battery. If the battery back 310 is mounted from the front surface of the printer unit 302, it is possible to supply power from terminals 312 to the apparatus.

Regarding the battery back 310 (hereinafter referred to as the battery 310), there are LEDs 323 for checking charge remaining on the battery 310 visually on the front surface of the printer unit 302. In order to reduce power consumption, the LEDs 323 do not light up in case of energy saving mode and the power is turned off unless a switch 321 is pressed. By pressing a switch 322, the surroundings of the paper output tray 305 is illuminated by a LED lightning (not shown in figures).

Figure 2A:
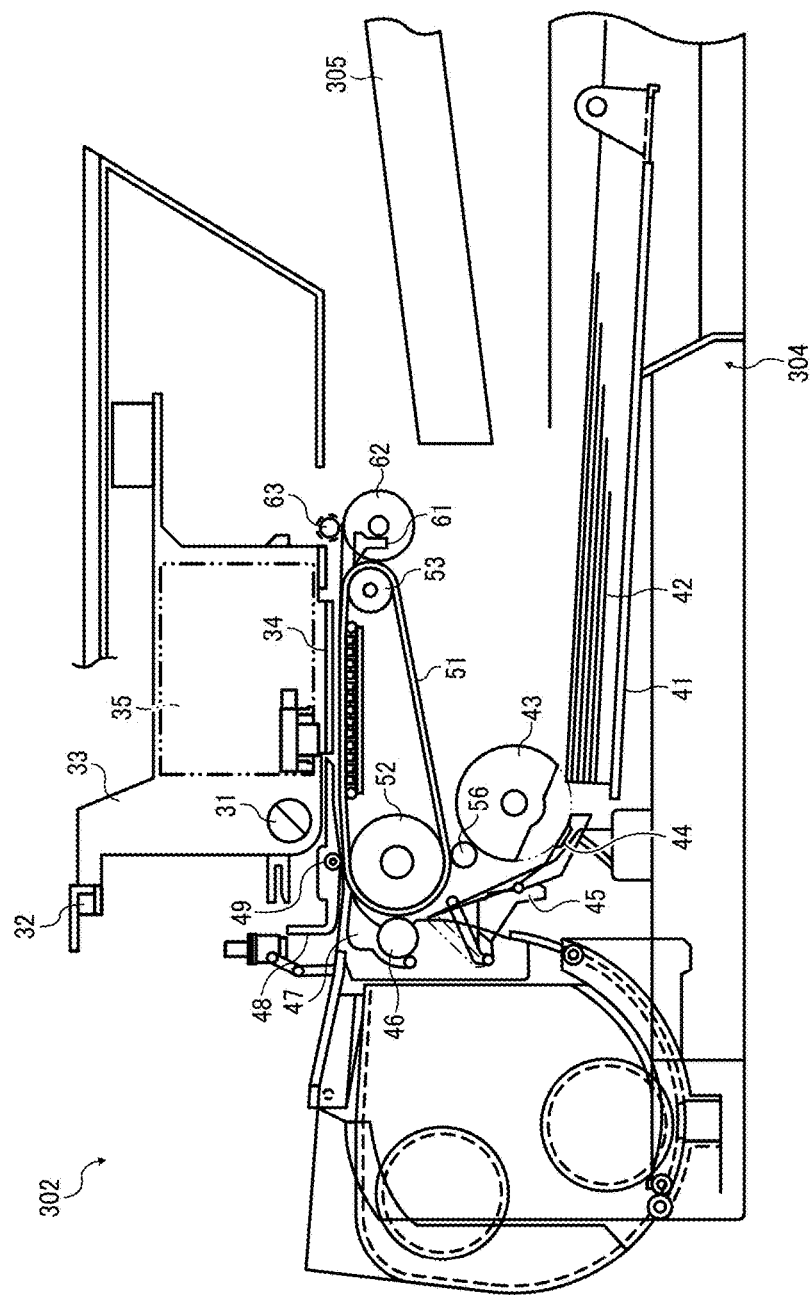
FIGS. 2A and 2B are diagrams illustrating an internal configuration of a printer unit of the MFP as an embodiment of the present invention.
Figure 2B:
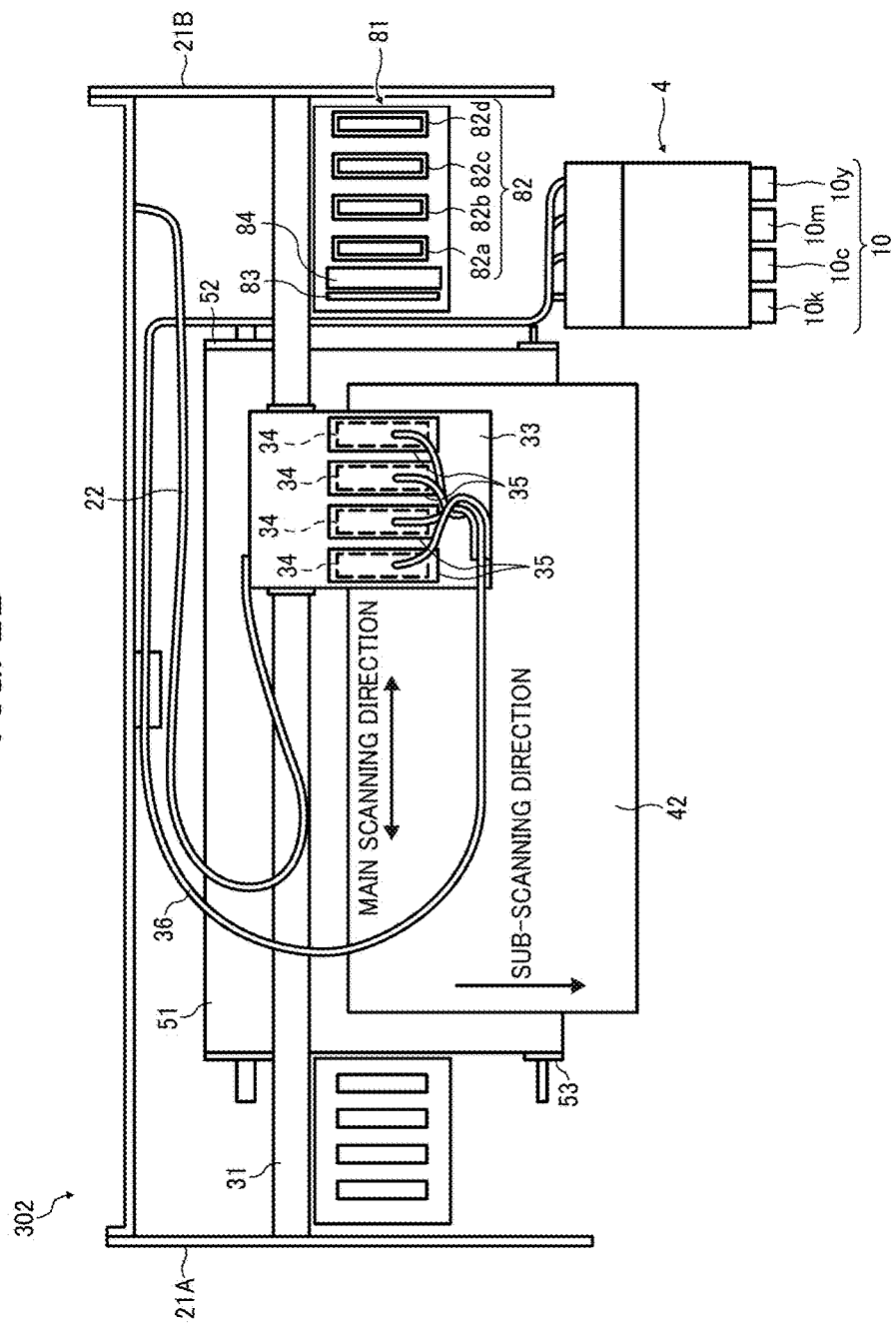

The MFP is described from its exterior appearance above. The internal configuration of the printer unit 302 in the MFP 100 is described below with reference to FIGS. 2A and 2B. FIG. 2A is a diagram illustrating the side view of the internal configuration of the MFP 100, and FIG. 2B is a diagram illustrating the top view of the internal configuration of the MFP 100.

A guide rod 31 and a stay 32 bridge a left side panel 21A and a right side panel 21B. A carriage 33 is supported by the guide rod 31 and the stay 32 in the main scanning direction. The carriage 33 can move in the direction shown by the arrow (in the main scanning direction) driven by the main scanning motor (not shown in figures).

In the carriage 33, four recording heads 34 that eject ink droplets in yellow (Y), cyan (C), magenta (M), and black (K) are mounted perpendicular to the main scanning direction, and a controller (not shown in figures) controls the ink droplets ejection of the recording heads 34 via a harness 22.

Further, the carriage 33 includes four sub-tanks 35 for supplying ink to each of the recording heads 34. Ink is supplied from ink cartridges 10 (10k, 10c, 10m, and 10y) loaded on a cartridge loading unit 4 to the corresponding sub-tank 35 via an ink feeding tube 36.

The paper feeding unit for feeding paper 42 from the paper feed tray 304 includes a semicircle paper feed roller 43 for feeding the paper 42 loaded on a paper loading plate 41 one by one separately, a separating pad 44 located facing to the paper feed roller 43. a guiding member 45, a counter roller 46, a carrying guide member 47, a press member 48, a head press roller 49, and a paper transferring belt 51 located facing to the recording heads 34.

The paper transferring belt 51 is entrained around a carrying roller 52 and a tension roller 53, and the paper transferring belt 51 moves in the direction shown by the arrow (in the sub-scanning direction) by driving the carrying roller with a sub-scanning motor (not shown in figures). In this case, the surface of the paper carrying belt is charged by a charging roller 56. The paper 42 fed from the paper feed unit sticks to the paper transferring belt 51 electrostatically, and the paper 42 is transferred under the recording heads 34.

In response to the paper 42 transferred under the recording heads 34, the carriage 33 drives the recording heads 34 in accordance with the image signal moving in the main scanning direction. As a result, the ink droplets are ejected on the still paper 42 in accordance with the image signal. Consequently, in case of finishing recording for one line, the paper 42 is transferred at predetermined distance in the sub-scanning direction, and the recording for next line is performed. Subsequently, similar steps are repeated. Finally, the recording operation finishes in response to receiving an end signal or a signal that indicates that the trailing edge of the paper 42 reaches the recording area.

The paper ejecting unit for ejecting the paper 42 after finishing recording includes a separating hook 61 for separating the paper 42 from the paper transferring belt 51, a paper ejecting roller 62, and an ejecting roller 63, and the ejected paper 42 is placed in stock on the paper output tray 305.

On the right edge of paper surface in the main scanning direction of the carriage 33, there is a maintenance and recovery unit 81 for maintaining and recovering the nozzle status of the recording heads 34. The maintenance and recovery unit 81 includes caps 82a, 82b, 82c, and 82d for capping each nozzle surface of the recording heads 34, a wiper blade 83 for wiping the nozzle surface, and a dummy ejection receiver 84 for receiving ink droplets ejected during the dummy ejections for ejecting thickened recording liquid.

After finishing recording (printing), the carriage 33 moves to the side of the maintenance and recovery unit 81. After performing the wiping operation for wiping the nozzle surface, the maintenance and recovery unit 81 keeps the nozzles wet by capping the recording heads 34 using the caps 82. Furthermore, by performing the dummy ejection operation for ejecting thickened recording liquid timely, the maintenance and recovery unit 81 maintains the stable ejection performance of the recording heads 34. These operations perform by the maintenance and recovery unit 81 described above are referred to as cleaning operation below.

Figure 3:
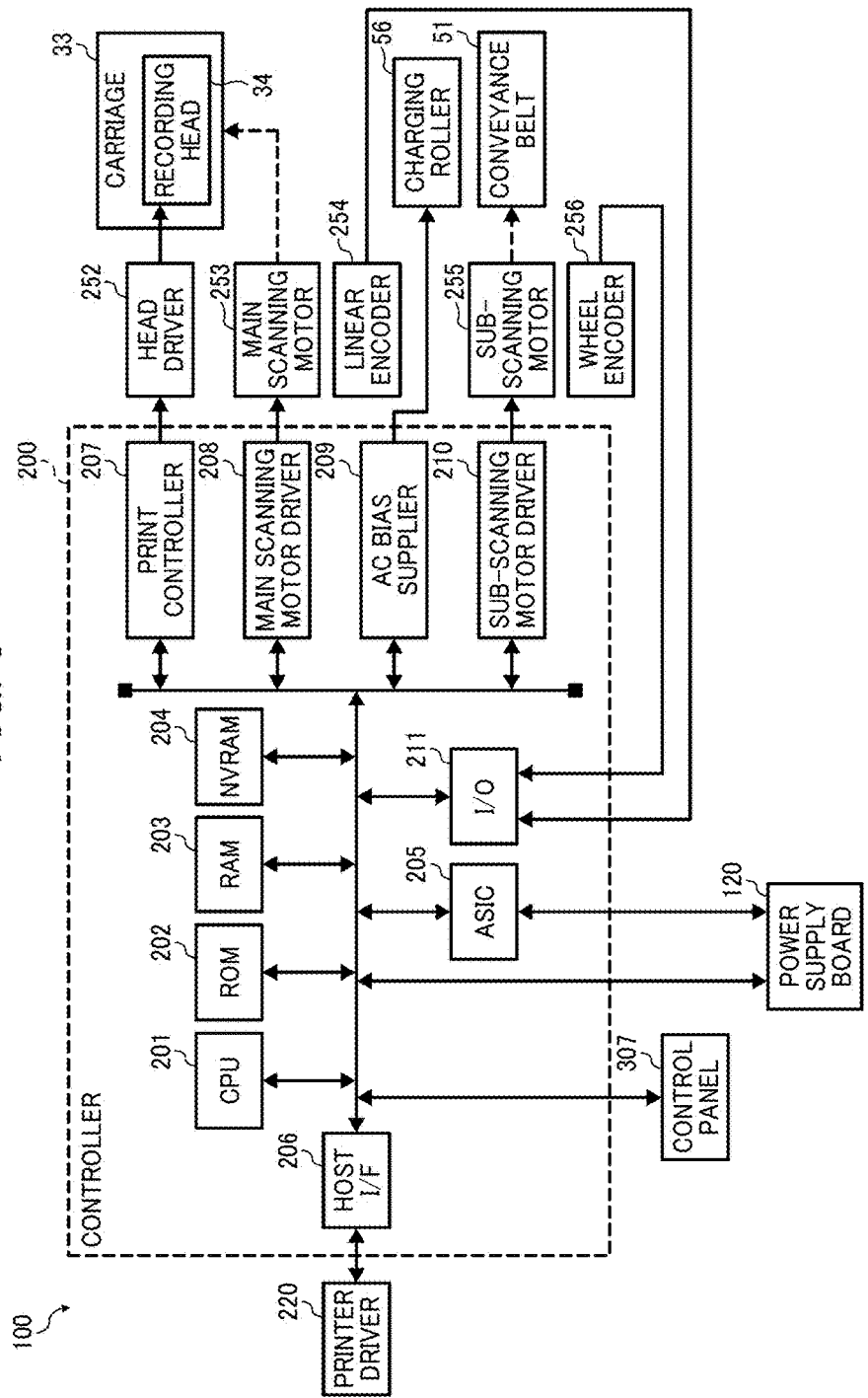
FIG. 3 is a diagram illustrating a system configuration of the MFP as an embodiment of the present invention.

The internal configuration of the MFP 100 in this embodiment is described above. The system configuration of the MFP is described below with reference to FIG. 3.

A controller 200 as a main controller that controls the whole part of the MFP 100 includes a CPU 201 that controls carrying the paper 42 and moving the recording heads 34 etc. a ROM 202 that stores programs etc. executed by the CPU 201, a RAM 203 that stores image data etc. temporarily, a NVRAM 204 that keeps data during the power-off, and an ASIC 205 that performs various image processing on the image data and processes input/output signals for controlling the whole part of the apparatus.

The controller further includes a host I/F 206 that transmits/receives print data from/to a printer driver 220 in the host, a print controller 207 that generates driving data for driving the recording head 34 and output the driving data to a head driver 252, a main scanning motor driver 208 that drives a main scanning motor 253, a sub-scanning motor driver 210 that drives a sub-scanning motor 255, an AC bias supplier 209 that applies high voltage to the charging roller 56, and an I/O 211 that inputs signals from a linear encoder 254 and a wheel encoder 256.

In addition, the controller 200 is connected to the control panel 307 that inputs and displays data necessary for the apparatus and a power supply board 120 that supplies power to the apparatus.

The system configuration of the MFP 100 is described above. The function of the power supply board 120 that controls operating power of the MFP 100 is described below.

Figure 4A:
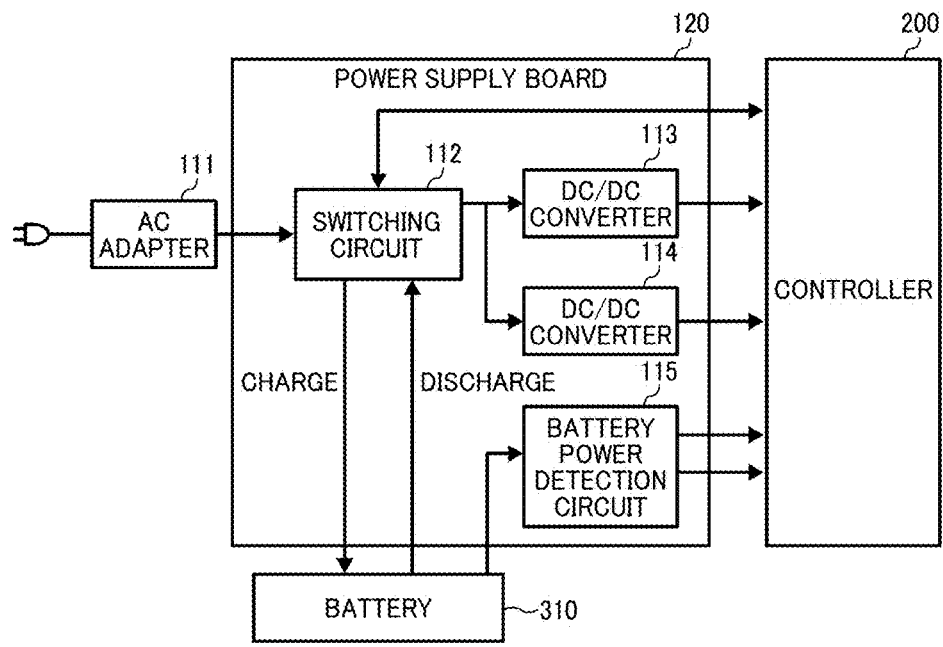
FIGS. 4A and 4B are diagrams illustrating a configuration of a power supply board included in the MFP as an embodiment of the present invention.

FIG. 4A is a diagram illustrating the configuration of the power supply board 120 included in the MFP 100. The power supply board 120 includes a switching circuit 112, DC/DC converters 113 and 114, and a battery power detection circuit 115.

The switching circuit 112 consists of a FET and a control IC. The switching circuit charges the battery 310 using the commercial power supplied via the AC adapter 111 and selects either the AC adapter 111 (i.e., the commercial power) or the battery 310 as the driving power.

The DC/DC converters 113 and 114 generate necessary DC voltage from a single power source supplied from a power source (either the AC adapter or the battery 310) and supply the DC voltage to the controller 200.

In the battery power detection circuit 115, a comparator IC compares voltage of the battery 310 with reference voltages configured using voltage dividing resistors and detects the voltage level of the battery 310 in five stages. The detected voltage level is not limited to five-staged, and it is possible to configure arbitrary three or more levels.

Figure 4B:
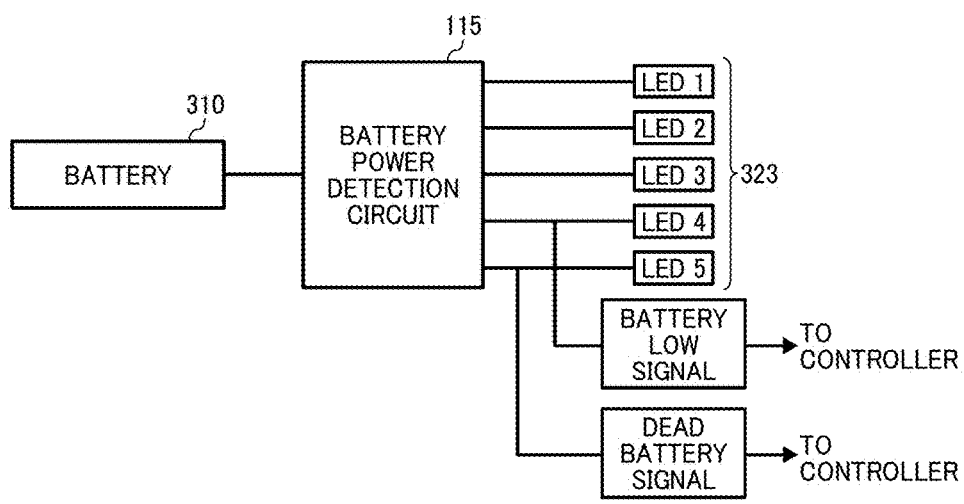

As shown in FIG. 4B, the battery power detection circuit 115 lights LEDs corresponding to the detected voltage level among file LEDs 323 (from LED 1 to LED 5). If the detected voltage level is lower than the second lowest level (corresponding to the LED 4), the battery power detection circuit 115 outputs "a battery low signal" to the controller 200 and notifies the controller 200 that the charge remaining on the battery 310 is getting low.

In addition, if the detected voltage level is lower than the lowest level (corresponding to the LED 5), the battery power detection circuit 115 outputs "a dead battery signal" to the controller 200 and notifies the controller 200 that the battery 310 is out of power.

In this embodiment, the voltage level (a first threshold) that outputs "the battery low signal" described above can be set to the lowest level that can assure executing an average-sized print job. In this case, depending on the size of the print job received after "the battery low signal" is output, it is possible that the battery 310 could run out while the print job is performed.

In this embodiment, the voltage level (a second threshold) that outputs "the dead battery signal" described above can be set to the level that is lower than the voltage level (the first threshold) that outputs "the battery low signal" and assures performing the cleaning operation. In this case, the cleaning operation at least includes the capping operation of the recording heads 34 and preferably includes the wiping operation and the dummy ejection operation. However, it is not always necessary to associate the voltage levels that output "the battery low signal" and "the dead battery signal" with the voltage levels that illuminates the LEDs 323, and it is possible to configure unique levels for those voltage levels.

Here, (the control IC of) the switching circuit 112 acquires driving power source information in response to turning on the power supply. The driving power source information includes information on whether or not the AC adapter 111 is connected and the battery 310 is connected (loaded).

If both two power supplies are connected when the power is turned on, the switching circuit 112 once switches the power source to the AC adapter 111. Subsequently, in accordance with a command from the controller 200 (described later), the switching circuit 112 switches the power source to either the AC adapter 111 or the battery 310 sequentially. By contrast, if one of the two power supplies is not connected when the power is turned on (e.g., the AC adapter 111 is not plugged in, or the battery 310 is not connected), the switching circuit 112 immediately switches the power source to the connected power supply.

The function that the power source board performs is described above. "A secondary battery usage mode" that the MFP 100 in this embodiment includes is described below.

In this embodiment, in "the secondary battery usage mode", if both the commercial power and the secondary battery are available as the power supply, the secondary battery is used preferentially in a predetermined time slot.

In this embodiment, in configuring the secondary battery usage mode, the MFP 100 accepts input for following three items by user operation:

(1) Whether or not the secondary battery usage mode is to be used
(2) Date when the secondary battery usage mode is enabled (every day/day setting/date setting etc.)
(3) Time slot when the secondary battery usage mode is used (start time/end time)

Figure 5:
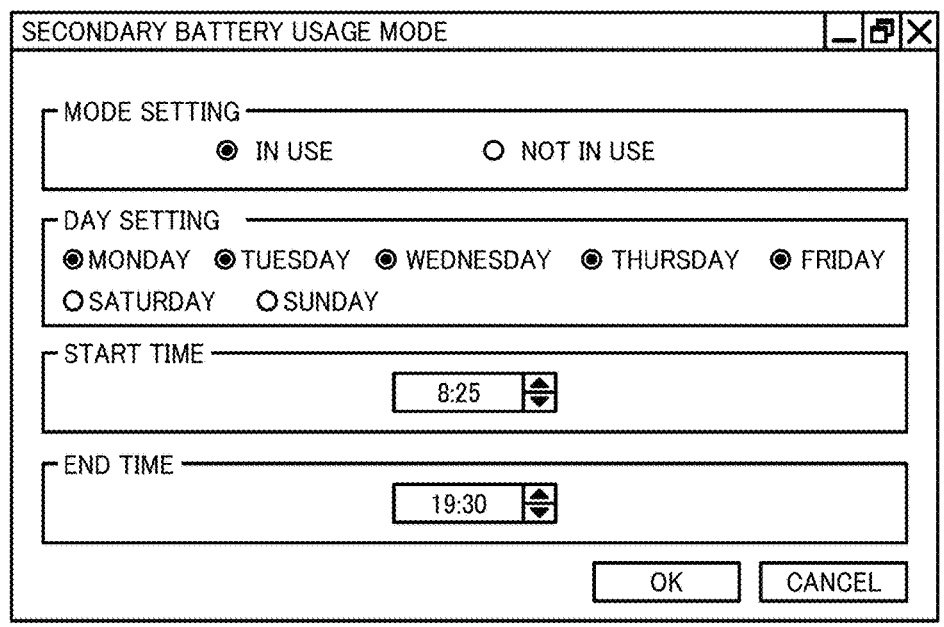
FIG. 5 is a diagram illustrating a screen for configuring a secondary battery usage mode that a printer driver provides as an embodiment of the present invention.
Figure 6:
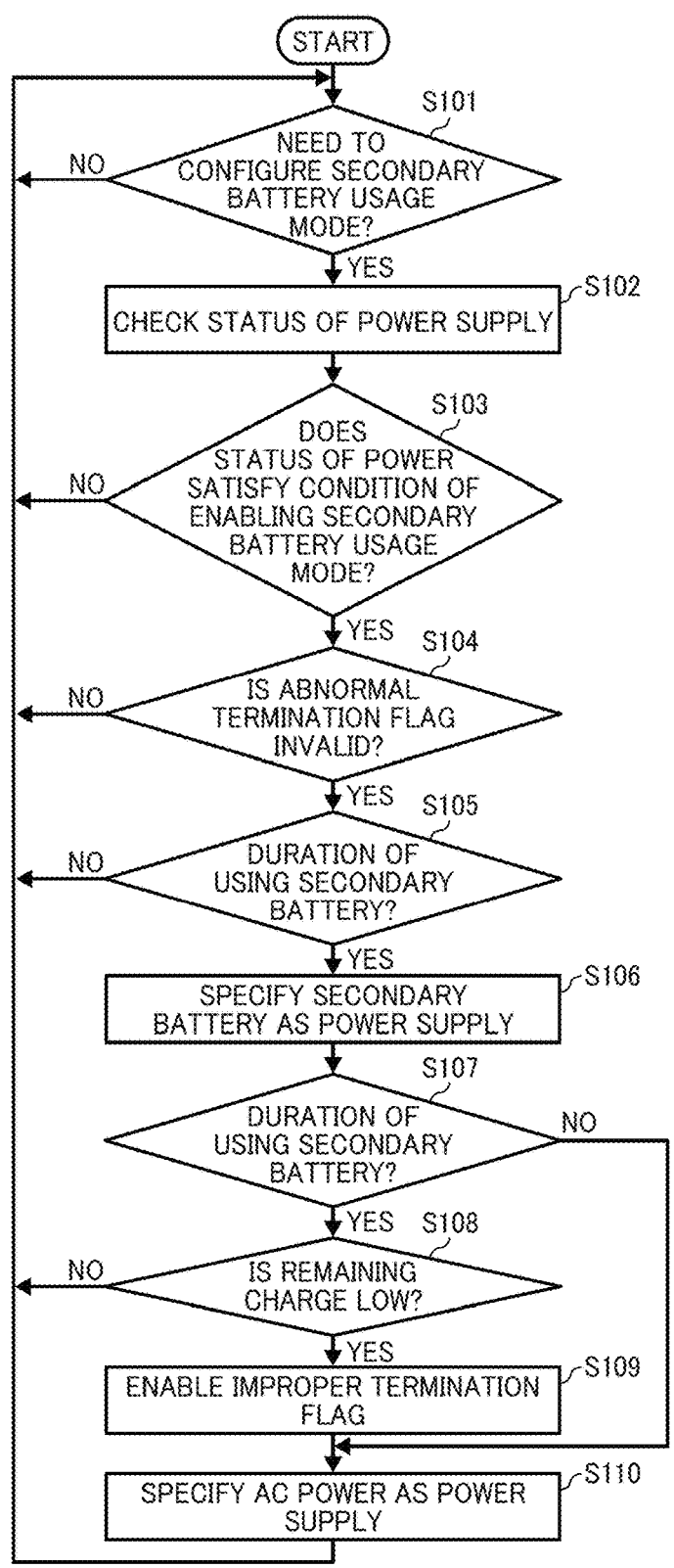
FIG. 6 is a flowchart illustrating a process performed by the MFP as an embodiment of the present invention.

In this embodiment, the above items can be input from the control panel 307. Alternatively, it is possible to accept input via a printer driver in a personal computer (PC) connected to the MFP 100. FIG. 5 is a diagram illustrating an UI screen for configuring a secondary battery usage mode that a printer driver provides The configuration information regarding the secondary battery usage mode is stored in the NVRAM 204 included in the controller 200. The secondary battery usage mode is implemented by executing a dedicated program stored in the ROM 202 by the CPU 201. The secondary battery usage mode that the controller 200 implements is described below with reference to the flowchart shown in FIG. 6.

After turning on the main power of the MFP 100, the controller 200 starts up in response to power from the power supply board 120, and the controller 200 starts performing the following steps.

After starting up, the controller 200 first refers to the configuration information stored in the NVRAM 204 and determines whether or not the secondary battery usage mode is to be used in S101. As a result, step S101 is repeated as long as the secondary battery usage mode is not to be used (NO in S101). By contrast, if the secondary battery usage mode is to be used (YES in S101), the process proceeds to S102.

In S102, the status of the power supply is checked as described below. First, the power supply information (whether or not the AC adapter 111 is connected and whether or not the battery 310 is connected) is checked at the switching circuit 112 in the power supply board 120. In response to the query, whether or not the AC adapter 111 is connected and whether or not the battery 310 is connected from the power supply information provided by the switching circuit 112. In addition, it is detected whether or not there is "the battery low signal" and "the dead battery signal" input from the battery power detection circuit in the power supply board 120.

Next, in S103, after specifying whether or not the AC adapter 111 is connected, whether or not the battery 310 is connected, and the status of the power supply from whether or not there is the input signal from the battery power detection circuit 115, it is determined whether or not the status of the power supply satisfies the condition to perform the secondary battery usage mode.

Here, in this embodiment, the condition to perform the secondary battery usage mode is that both the AC adapter 111 and the battery 310 are available as the power supply. Specifically, the condition to perform the secondary battery usage mode is that both the AC adapter 111 and the battery 310 are connected in the state that can supply power and the charge remaining on the battery 310 is enough (more specifically, neither "the battery low signal" nor "the dead battery signal" is detected).

In S103, as long as it is determined that the status of the power supply does not satisfy the condition to perform the secondary battery usage mode (NO in S103), the process returns to S101 and the steps described above are repeated.

By contrast, if it is determined that an improper termination flag is invalid in S104 (YES in S104), the process proceeds to S105. In S105, after comparing the current date/time with the configuration information stored in the NVRAM 204 (date and time slot when the secondary battery usage mode is activated), it is determined whether or not the current time belongs to the time slot when the secondary battery usage mode is activated (hereinafter referred to as secondary battery usage period).

As a result, if it is determined that the current time does not belong to the secondary battery usage period (NO in S105), the process returns to S101, and the steps described above are repeated. By contrast, if it is determined that the current time belongs to the secondary battery usage period (YES in S105), the process proceeds to S106, and the power supply board 120 is instructed to select the battery 310 as the power supply.

Specifically, the controller 200 outputs a signal that indicates that the secondary battery is selected as the power supply (hereinafter referred to as a secondary battery selection signal) to the power supply board 120. In case of satisfying the condition to perform the secondary battery usage mode just after the start-up of the apparatus, since the AC adapter 111 is the power supply, in response to receiving the secondary battery selection signal, the switching circuit 112 changes the active power source from the AC adapter 111 to the battery 310.

Next, the process proceeds to S107. After comparing the current time with the configured secondary battery usage period, it is determined whether or not the current time belongs to the secondary battery usage period again. As a result, if it is determined that the current time belongs to the secondary battery usage period (YES in S107), the process proceeds to S108, and it is determined whether or not the charge remaining on the secondary battery is decreasing. Specifically, it is detected whether or not there is "the battery low signal" input from the battery power detection circuit 115 in the power supply board 120.

As a result, as long as "the battery low signal" is not input (NO in S108), the process returns to S101, and the steps described above are repeated.

In repeating the steps from S101 to S108 described above, if the current time does not belong to the secondary battery usage period any more (NO in S107), the process proceeds to S110, and the power supply board 120 is instructed to select the AC adapter 111 as the power supply in S110.

Specifically, the controller 200 outputs a signal that specifies the commercial power as the power supply (hereinafter referred to as a commercial power selection signal) to the power supply board 120. At this moment, the battery 310 is the power supply, and the switching circuit 112 changes the active power source from the battery 310 to the AC adapter 111 in response to receiving the commercial power selection signal.

By contrast, in S108, if it is determined that the remaining of the secondary battery is decreasing (i.e., in case of detecting input of "the battery low signal"), after enabling the improper termination flag in S109, the power supply is changed to the AC adapter 111 immediately in S110.

In this embodiment, the "improper termination flag" is for managing history that the active power source is changed from the secondary battery to the commercial power before the scheduled secondary battery usage period expires. In the secondary battery usage period while the secondary battery usage mode is activated, the improper termination flag is enabled in response to receiving "the battery low signal" from the battery power detection circuit 115, and the improper termination flag is reset when the secondary battery usage period expires. The improper termination flag is also reset due to rebooting of the controller 200 or updating of the configuration information of the secondary battery usage mode.

In this embodiment, in case of detecting that the remaining charge on the secondary battery is decreasing and stopping utilization of the secondary battery before the scheduled secondary battery usage period expires, even if the secondary battery is charged subsequently and the condition for using the secondary battery is satisfied (YES in S103), the improper termination flag is not reset until the secondary battery usage period that it stopped to use the secondary battery expires (NO in S104).

That is, in case of stopping using the secondary battery before the secondary battery usage period expires, the secondary battery will not be designated as the power supply again until the secondary battery usage period expires. The power supply is fixed to the commercial power until the next secondary battery usage period arrives, and the secondary battery is filled up. As described above, it is possible to avoid repeating charging and discharging the secondary battery at short period of time, and that can prevent the second battery from deteriorating.

In this embodiment, the capacity of the secondary battery is configured appropriately in accordance with the length of the scheduled secondary battery usage period. That is, the length of the implementable secondary battery usage period depends on the capacity of the using secondary battery.

Next, the configuration of the secondary battery usage mode in this embodiment is described below with reference to the diagram that illustrates state transition shown in FIG. 7.

Figure 7:
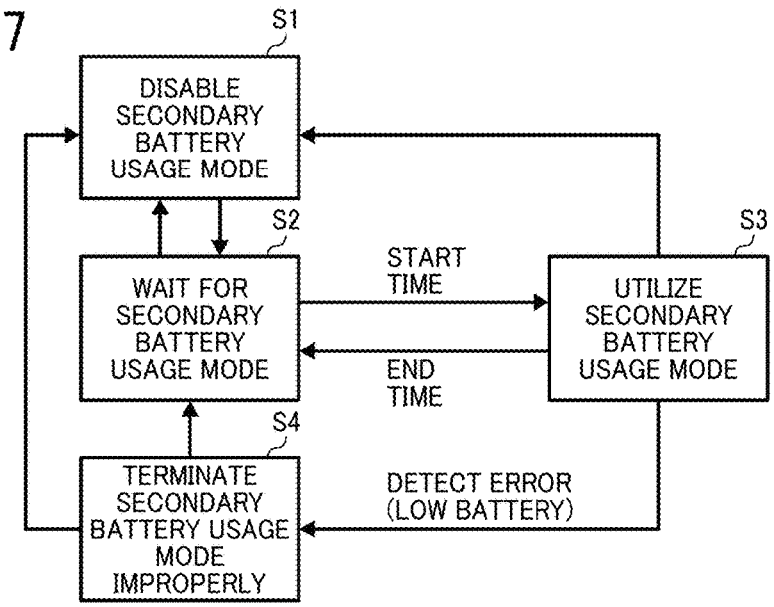
FIG. 7 is a diagram illustrating state transition of the secondary battery usage mode as an embodiment of the present invention.

As shown in FIG. 7, in this embodiment, there are four states regarding the secondary battery usage mode as shown below.

S1: The secondary battery usage mode is invalid.
S2: The secondary battery usage mode is idling.
S3: The secondary battery usage mode is in use.
S4: The secondary battery usage mode is terminated improperly.

Here, S1 indicates that it is unnecessary to use the secondary battery usage mode or the condition to perform the secondary battery usage mode is not satisfied even if it is necessary to perform the secondary battery usage mode. Therefore, in S1, the secondary battery usage mode is not performed, and the switching circuit 112 selects the power supply independently. Specifically, if both the commercial power and the secondary battery are available as the power supply, the commercial power is set to the power supply. If one of those power supplies cannot be used, the available power supply is set to the power supply. In S1, if it is changed that the secondary battery usage mode is necessary to use and the condition to perform the second battery usage mode is satisfied, the state transitions to S2.

In S2, the secondary battery usage period has not arrived yet in case the secondary battery usage mode is set to be used and the condition for using the secondary battery is satisfied. Therefore, the commercial power is selected as the power supply in S2, and the secondary battery is charged during S2. If the secondary battery usage mode is set not to be used in S2, the state transitions to S1.

In S3, the secondary battery usage period has arrived already in case the secondary battery usage mode is set to be used and the condition for using the secondary battery is satisfied. If the start time of the secondary battery usage period has arrived, the state transitions from S3 to S2, and the power supply changes from the secondary battery to the commercial power. If the secondary battery usage mode is set not to be used in S3, the state transitions to S1.

Figure 8:
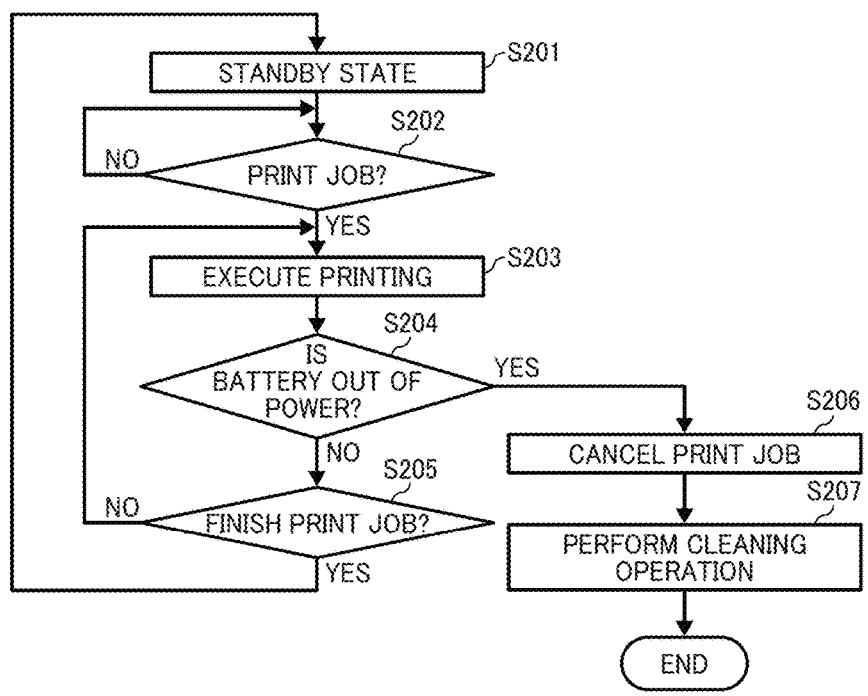
FIG. 8 is a flowchart illustrating a process performed by the MFP as an embodiment of the present invention.

Lastly, in case the state transitions to S1 since the AC adapter 111 is not connected (the commercial power is unavailable), the process performed by the controller 200 is described below with reference to FIG. 8

The ASIC 205 in the controller 200 transitions to standby state in S201 and waits for a print job (NO in S202). After receiving the print job (YES in S202), the ASIC 205 executes the print job in S203. It should be noted that the electric power is supplied by the battery 310 in the steps described above.

In executing the print job, the ASIC 205 determines whether or not the battery 310 is out of power in S204. In this embodiment, the dead battery signal issued by the battery power detection circuit in the power supply board 120 is input to the ASIC 205, so the ASIC 205 detects whether or not there is the dead battery signal in S204.

As a result, as long as the dead battery signal is not detected (NO in S204), the printing process is executed until the received print job finishes (NO in S205 and S203)

By contrast, if the ASIC 205 detects the dead battery signal in S204 (YES in S204), that is reported to the CPU 201, and the print job is canceled immediately in S206. Subsequently, the process proceeds to S207, and the cleaning operation is performed in S207.

Here, in this embodiment, as described above, since the voltage level that the dead battery signal is output is set to the level that assures performing the cleaning operation, the recording head 34 is capped to prevent nozzle dropout due to dried-out nozzles from occurring even if the secondary battery dies during the print job.

As described above, the MFP 100 in this embodiment can contribute to leveling electricity demand peaks in offices. For example, if the time slot during daytime hours is configured as the secondary battery usage period for all of or part of the multiple MFP 100 located in the offices, it is possible to reduce the commercial power consumption during daytime hours when electric power demand reaches a peak, and the reduced power consumption shifts to nighttime hours with lower electric power demand. Consequently, peaks in electric power demand can be leveled.

In the embodiment described above, a multifunctional inkjet printer is used as the image forming apparatus of the present invention. However, the present embodiment is not limited to the case described above, and it is possible to apply the present invention to a single-functional printer that implements the printing function only.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination.

The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The present invention also encompasses a power supply control method performed by an image forming apparatus. The method includes the steps of selecting either commercial power or a secondary battery as a power supply, controlling the power supply selecting step, determining whether or not both the commercial power and the secondary battery are available, instructing in the power supply selecting step when both the commercial power and the secondary battery are available, selecting the secondary battery as the power supply during a predetermined secondary battery usage period, and selecting the commercial power as the power supply at times other than the secondary battery usage period.

The present invention also encompasses a non-transitory recording medium storing a program that executes a power supply control method. The power supply control method includes the steps of selecting either commercial power or a secondary battery as a power supply, controlling the power supply selecting step, determining whether or not both the commercial power and the secondary battery are available, instructing in the power supply selecting step when both the commercial power and the secondary battery are available, selecting the secondary battery as the power supply during a predetermined secondary battery usage period, and selecting the commercial power as the power supply at times other than the secondary battery usage period.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that, within the scope of the appended claims, the disclosure of this patent specification may be practiced otherwise than as specifically described herein. For example, it is possible that the image forming apparatus includes the document holding determination unit only. Alternatively, it is possible that the image forming apparatus includes the document holding determination unit and any one of or any combination of the rangefinder, the user authentication unit, the recovery processor, the print job acquisition unit, the auxiliary parameter setting unit, and the facsimile number setting unit.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. An image forming apparatus, comprising:
a power supply controller to select either commercial power or a secondary battery as a power supply;
an inputting unit configured to permit a user to schedule a secondary battery usage period specified by a scheduled start time and a scheduled end time;
a storage device to record the scheduled start time and end time that specify the secondary battery usage period; and
a main controller to control the power supply controller, wherein the main controller includes:
a power supply availability determination unit to determine whether or not both the commercial power and the secondary battery are available; and
a power supply selection unit to instruct the power supply controller, upon determining that both the commercial power and the secondary battery are available and that a current time falls within the scheduled secondary battery usage period between the scheduled start time and end time, recorded in the storage device and specified via the inputting unit, to select the secondary battery as the power supply during the scheduled secondary battery usage period and to select the commercial power as the power supply at times other than the scheduled secondary battery usage period,
wherein after the power supply selection unit instructs the power supply controller to select the secondary battery as the power supply while both the commercial power and secondary battery are available during the secondary battery usage period specified by the scheduled start time and end time recorded in the storage device, the power supply selection unit, in response to secondary battery power falling below a predetermined threshold before expiration of the scheduled secondary battery usage period, enables an improper termination flag and instructs the power supply controller to select the commercial power as the power supply and stop using the secondary battery as the power supply, and the improper termination flag enabled by the power supply selection unit inhibits the power supply controller from selecting the secondary battery as the power supply again even if the secondary battery power becomes higher than the predetermined threshold, unless and until the improper termination flag is reset to be disabled after the scheduled secondary battery usage period specified by the scheduled start time and end time recorded in the storage device expires.

2. The image forming apparatus according to claim 1, wherein the power supply controller notifies the main controller whether or not the commercial power is connected and whether or not the secondary battery is connected and notifies the main controller when secondary battery power of the secondary battery falls below a first threshold.

3. The image forming apparatus according to claim 2, wherein the power supply availability determination unit determines that both the commercial power and secondary battery are unavailable if either (1) at least one of the commercial power and the secondary battery is not connected or (2) the secondary battery power is less than the first threshold.

4. The image forming apparatus according to claim 3, wherein the power supply availability determination unit determines that both the commercial power and secondary battery are available if both the commercial power and secondary battery are connected and the secondary battery power is equal to or greater than the first threshold.

5. The image forming apparatus according to claim 1, further comprising a recording head, wherein the main controller cancels an image formation operation and performs a cleaning operation of the recording head in case the commercial power is unavailable and the power supply controller notifies the main controller that the secondary battery power is below a second threshold smaller than the first threshold during execution of the image formation operation.

6. The image forming apparatus according to claim 5, wherein the cleaning operation includes capping the recording head.

7. The image forming apparatus according to claim 1, wherein the power supply controller selects an available power supply as the power supply if either the commercial power or the secondary battery is unavailable.

8. The image forming apparatus according to claim 1, wherein the secondary battery usage period is specified for at least one day of a week.

9. The image forming apparatus according to claim 1, wherein when the power supply controller selects the secondary battery as the power supply, the image forming apparatus is permitted to perform an image formation operation until the secondary battery power falls below a first threshold.

10. An image forming apparatus, comprising:
  a power supply controller to select either commercial power or a secondary battery as a power supply;
  an inputting unit configured to permit a user to schedule a secondary battery usage period specified by a scheduled start time and a scheduled end time; and
  a main controller to control the power supply controller, wherein the main controller includes:
    a power supply availability determination unit to determine whether or not both the commercial power and the secondary battery are available; and
    a power supply selection unit to instruct the power supply controller, upon determining that both the commercial power and the secondary battery are available and that a current time falls within the scheduled secondary battery usage period between the scheduled start time and the scheduled end time, specified via the inputting unit, to select the secondary battery as the power supply during the scheduled secondary battery usage period and to select the commercial power as the power supply at times other than the scheduled secondary battery usage period,
  wherein when both the commercial power and secondary battery are available during the secondary battery usage period, and after the power supply selection unit instructs the power supply controller to select the secondary battery as the power supply, the power supply selection unit, in response to secondary battery power falling below a predetermined threshold before expiration of the scheduled secondary battery usage period, enables an improper termination flag and instructs the power supply controller to select the commercial power as the power supply and stop using the secondary battery as the power supply, and then until the scheduled secondary battery usage period expires, the power supply selection unit does not instruct the power supply controller to select the secondary battery as the power supply again or disable the improper termination flag even if the secondary battery power becomes higher than the predetermined threshold, unless configuration information in the image forming apparatus is updated, which causes the improper termination flag to be disabled and the power supply selection unit to instruct the power supply controller to select the secondary battery as the power supply.

* * * * *